United States Patent [19]

Coates et al.

[11] Patent Number: 4,834,906

[45] Date of Patent: May 30, 1989

[54] SMECTIC A LIQUID CRYSTAL COMPOSITIONS

[75] Inventors: David Coates; Anthony B. Davey, both of Bishop's Stortford; David I. Bishop, Poole; Andrew D. Pearson, Hythe; Ian C. Sage, Poole, all of Great Britain

[73] Assignee: Merck Patent Gesellschaft mit Beschrankter Haftung, Darmstadt, Fed. Rep. of Germany

[21] Appl. No.: 923,794

[22] PCT Filed: Dec. 20, 1985

[86] PCT No.: PCT/EP85/00731

§ 371 Date: Sep. 22, 1986

§ 102(e) Date: Sep. 22, 1986

[87] PCT Pub. No.: WO86/04324

PCT Pub. Date: Jul. 31, 1986

[30] Foreign Application Priority Data

Jan. 22, 1985 [GB] United Kingdom ................ 8501548

[51] Int. Cl.$^4$ ........................ G02F 1/13; C09K 19/30; C09K 19/12; C09K 19/32
[52] U.S. Cl. ............................ 252/299.63; 252/299.5; 252/299.01; 252/299.62; 252/299.65; 252/299.66; 350/350 S
[58] Field of Search ........... 252/299.5, 299.66, 299.63, 252/299.62, 299.65, 299.01; 350/350 S

[56] References Cited

U.S. PATENT DOCUMENTS

| | | | |
|---|---|---|---|
| 3,925,237 | 12/1975 | Ross et al. | 252/299.62 |
| 3,925,238 | 12/1975 | Gavrilovic | 252/299.65 |
| 4,013,582 | 3/1977 | Gavrilovic | 252/299.63 |
| 4,112,239 | 9/1978 | Dubois et al. | 252/299.65 |
| 4,113,647 | 9/1978 | Coates et al. | 252/299.63 |
| 4,149,413 | 4/1979 | Gray et al. | 252/299.67 |
| 4,227,778 | 10/1980 | Raynes | 252/299.63 |
| 4,387,038 | 6/1983 | Fukui et al. | 252/299.63 |
| 4,402,855 | 9/1983 | Zann et al. | 252/299.65 |
| 4,614,608 | 9/1986 | Le Barny et al. | 252/299.5 |
| 4,645,305 | 2/1987 | Yokokura et al. | 252/299.63 |

FOREIGN PATENT DOCUMENTS

| | | | |
|---|---|---|---|
| 60-255753 | 12/1985 | Japan | 252/299.67 |
| 2031010 | 4/1980 | United Kingdom | 252/299.63 |

OTHER PUBLICATIONS

Coates, D., et al., Mol. Cryst. Liq. Cryst., vol. 37, pp. 249-262 (1976).

*Primary Examiner*—Teddy S. Gron

*Attorney, Agent, or Firm*—Millen & White

[57] ABSTRACT

Liquid crystal compositions comprising as a first part between 40 and 99% by weight in aggregate of one or more materials selected from one or more of the six compound classes (1) to (3'), wherein R is in every instance an alkyl chain containing between 2 and 18 carbon atoms and R' is in every instance an alkyl chain containing between 1 and 17 carbon atoms, wherein one or more non-adjacent $CH_2$-groups are replaced by oxygen atoms, and as a second part between 1 and 60% by weight of one or more materials of high birefringence and high positive dielectric anisotropy which raise the $S_A$-N transition temperature, exhibit a smectic A phase of relatively low melting point and wide smectic range. Such compositions may be used in liquid crystal cells, not only in display or optical information processing applications, but also for instance in temperature sensing applications. The operation of such cells may involve laser addressing, thermal or electrical addressing.

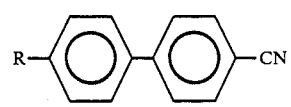

(1)

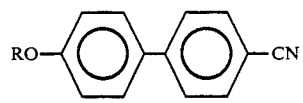

(2)

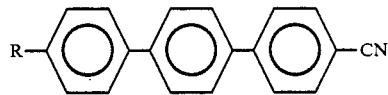

(3)

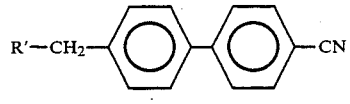

(1')

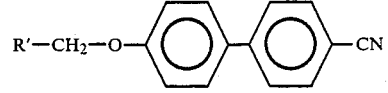

(2')

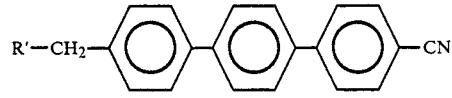

(3')

7 Claims, No Drawings

SMECTIC A LIQUID CRYSTAL COMPOSITIONS

BACKGROUND OF THE INVENTION

The present invention relates to liquid crystal compositions which exhibit a smectic A phase of relatively low melting point and wide smectic range. Such compositions may be used in liquid crystal cells, not only in display or optical information processing applications, but also for instance in temperature sensing applications. The operation of such cells may involve laser addressing, thermal or electrical addressing.

Smectic A liquid crystals are highly viscous and therefore often require substantially greater energy, in the form of heat, light or electric field, to effect any molecular change in the phase than do typical nematic or cholesteric liquid crystals.

From a practical point of view, for most applications, it is desirable for the smectic A phase to exist at room temperature. It is also desirable for this smectic A phase to be present over a relatively wide temperature range in order that it may be used, without recourse to thermostatting, in equipment that is designed for use in situations involving a wide range of service temperature. Typical smectic A mixtures that are currently commercially available exhibit somewhat inconveniently narrow ranges of smectic A phase for a number of applications. Thus it is seen from the following table of smectic A phase materials commercially available from BDH Chemicals Ltd. under the designations S1 to S5 that the lower end of the service temperature range does not extend significantly below the freezing point of water, while the upper end is limited to between about 40° and 55° C.

|    | $K$-$S_A$ | $S_A$-$N$ | $N$-$I$ |
|----|-----------|-----------|---------|
| S1 | 5         | 40        | 43° C.  |
| S2 | −1        | 48        | 49      |
| S3 | 0         | 55        | 61      |
| S4 | 0         | 54        | 57      |
| S5 | 1         | 55.5      | 61      |

An object of the present invention is the provision of liquid crystal mixtures with an extended temperature range for the smectic A phase, typically one that extends to cover the range from about −10° C. to about +70° C., but the scope of the invention is not restricted to this temperature range.

It should be noted that, to be useful in the types of smectic A displays described above, the smectic A liquid crystal mixtures must also possess other appropriate properties in addition merely to the smectic A phase. For example, many of the display principles involved depend upon reorienting the liquid crystal to a homeotropic state by means of an external electric field to erase information written on the display. This reorientation may be performed in the smectic phase, in the nematic phase, or in the isotropic phase just above the N-I transition where sufficient post-transitional order remains. So that this reorientation may be achieved by the minimal electric field (i.e. the minimum applied voltage) it is desirable that the smectic A components possess a relatively high positive dielectric anisotropy. Furthermore, many of the types of smectic displays described above depend for their optical contrast on a difference in texture between the part upon which information is written and the part upon which information is not written. Various means are adopted according to the display technology to induce a light scattering texture in the part where information is written. The efficacy of the scattering process towards incident light of visible wavelengths depends upon the optical birefringence of the smectic liquid crystal, and this, therefore, preferably should also be relatively high. Furthermore, an attractive feature of the smectic A type of display depends upon the fact that the scattering texture so induced is permanent so that information written into the display does not need to be refreshed continuously as in the twisted nematic or phase-change types of display, thus simplifying the electronic driving circuits. Now experience has shown that the stability of the scattering texture does not persist throughout the whole of the $S_A$ phase but diminishes with increasing temperature of the display because at a particular temperature the scattering texture is reoriented from the surrounding unwritten homeotropic part, thus spontaneously erasing the written information. It is important that the temperature at which reorientation occurs be well above any temperature that the display will experience. In general this temperature is proportional to the $S_A$-$N$ transition temperature of the mixture. Finally of course, the additives incorporated for the purpose of raising the $S_A$-$N$ transition temperature must be stable optically and thermally, and must not suffer electrochemical degradation under the voltages necessary to operate the display.

It is an object of this invention to provide additives with the properties described above.

SUMMARY OF THE INVENTION

These compositions may be used as they are, or they may form a base mixture to which may be added up to 10% by weight in aggregate of one or more chiral, ionic, surfactant, and/or guest dye and the like additions. According to the present invention there is provided a liquid crystal composition exhibiting a smectic A phase comprising as a first part between 40 and 99% by weight in aggregate of one or more materials selected from one or more of the following six compound classes,

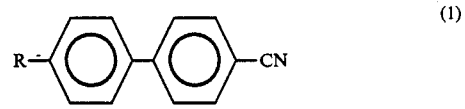

(1)

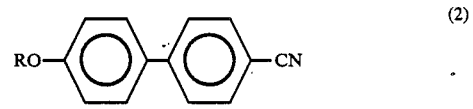

(2)

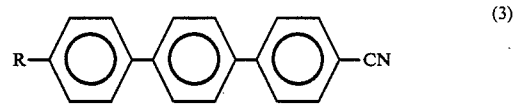

(3)

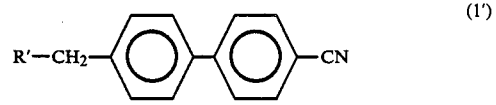

(1')

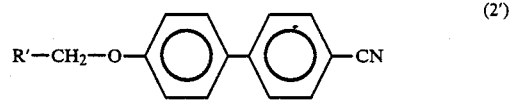

(2')

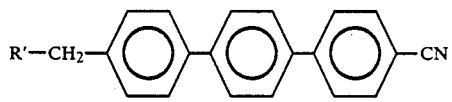

wherein R is in every instance an alkyl chain containing between 2 and 18 carbon atoms and R' is in every instance an alkyl chain containing between 1 and 17 carbon atoms, wherein one or more non-adjacent $CH_2$-groups are replaced by oxygen atoms, and as a second part between 1 and 60% by weight of one or more materials of high birefringence and high positive dielectric anisotropy which raise the $S_A$-N transition temperature.

Preferably the second part material comprises between 3 and 60%, in particular between 10 and 30% by weight of the liquid crystal composition. The second part materials are of high birefringence, i.e. $\Delta n > 0,15$, in particular $> 0,17$. The dielectric anisotropy of the second part materials is $> +8$, in particular $> +10$. Preferably the second part materials are compounds comprising three or four ring structures. They preferably contain at least two 1,4-phenylene rings preferably a 4-cyanobiphenyl-4'-yl group, a bridging element selected from the group consisting of —O—CO—, —CO—O— and —$CH_2CH_2$— and/or one trans-1,4-cyclohexylene ring.

According to the present invention there is provided a liquid crystal composition exhibiting a smectic A phase, which composition either consists exclusively of a base mixture or consists of a base mixture together with not more than 10% by weight in aggregate of one or more other constituents, characterised in that the base mixture contains, as a first part, between 40 and 99% by weight in aggregate of one or more materials selected from one or more of the following six compounds classes,

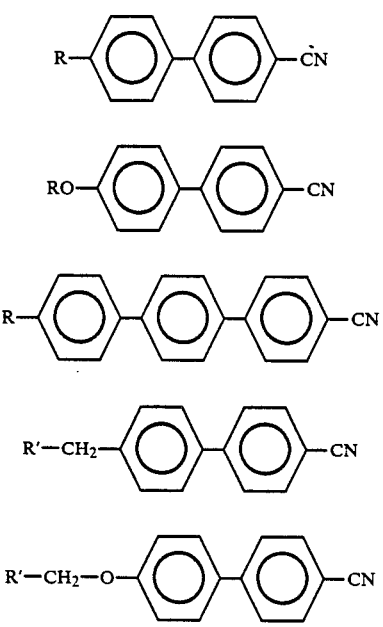

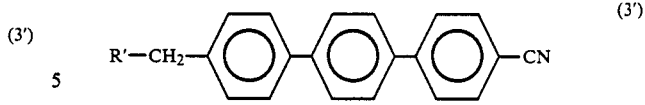

and in that the balance of the base mixture is provided by a second part consisting of one or more materials selected from one or more of the following eleven compound classes,

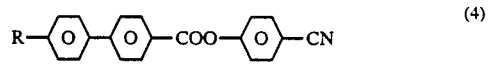

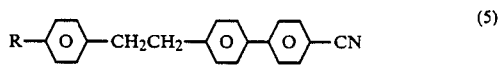

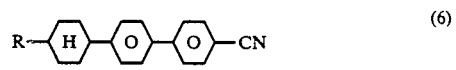

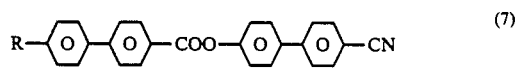

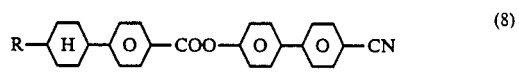

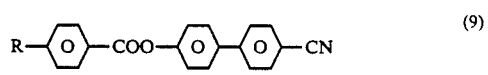

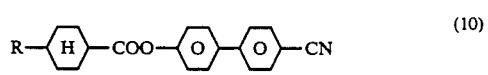

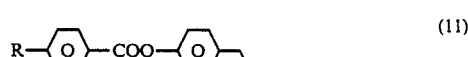

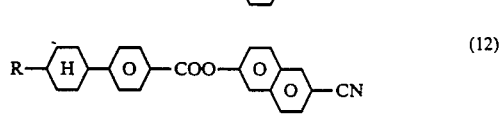

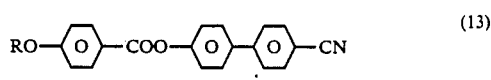

and

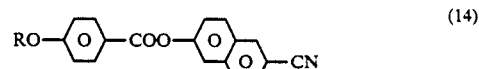

wherein R is in every instance an alkyl chain containing between 2 and 18 carbon atoms.and R' is in every instance an alkyl chain containing between 1 and 17 carbon atoms, wherein one or more non-adjacent $CH_2$-groups are replaced by oxygen atoms.

The compound classes (1) and (2) of the first part of the mixture, where R is a straight chain alkyl group containing more than 7 carbon atoms, are known smectic A phase liquid crystals, some of which have an $S_A$ phase in the vicinity of room temperature. Thus, the n-octyl homologue of compound of class (1), 4-cyano-4'-n-octyl biphenyl, has the transition temperatures K-$S_A$, 21.5° C.; $S_A$-N, 33.5° C.; N-I, 40.5° C. The temperature range of the smectic phase can be extended somewhat by mixing two or more homologues. Thus a mixture of 58% of the n-octyl homologue with 42% of the n-decyl has the constants K-S$_A$, 5° C.; S$_A$-N, 40° C.; N-I, 43° C. However, the relatively low transition temperatures of compounds of class (1) preclude the possibility of preparing a mixture suitable for most practical displays from these components alone.

Compounds of class (2), where R is a straight chain alkyl group containing more than 7 carbon atoms, have higher S$_A$-N transition temperatures, typically about 70° C., but their melting points are also much higher, typically 50°-60° C. Mixtures composed only of compounds of class (2) can be prepared with S$_A$-N transition temperatures approaching 70° C., but their melting points are typically in the range 30° to 40° C., rendering them unsuitable for use in displays operating at ambient temperatures. Compounds of class (2) are nonetheless useful when mixed with compounds of class (1) in depressing the freezing point. Thus a mixture of 50% of the n-octyl homologue of class (1) with 38% of the n-decyl homologue of class (1) and 12% of the n-decyl homologue of class (2) has the transition temperatures K-S$_A$, −1° C.; S$_A$-N, 48° C.; N-I, 49° C.

Compounds of class (3) enable the S$_A$ phase of mixtures with classes (1) and (2) to be extended a little further, but their solubility in these mixtures is limited and the melting points soon become unacceptably high if too much is used.

The desirable dielectric, optical and stability properties of the additive(s) forming the second part of the mixture have been described above, and these properties are exhibited by additives of classes (4) to (14). As far as the thermotropic properties are concerned it is desirable that the additive(s) exhibit an S$_A$ phase stable up to as high a temperature as possible. Such phases are exhibited by the higher homologues of all the compounds of classes (4)–(14). However, occurrence of an enantiotropic S$_A$ phase in the additive is not obligatory as is evident from example (2), where the additive is from compound class (6), where R=C$_5$H$_{11}$, and example (6) where the additive is from compound class (10), where R=C$_2$H$_5$, in neither of which instances does the additive exhibit an enantiotropic S$_A$ phase.

The elevating effect of a single additive of the second part of the base mixture on the transition temperatures of the first part is typically proportional to its concentration as exemplified below. The proportion of a single additive that can be used is limited by its solubility in the first part, too high a concentration also raising the melting point. Judicious choice of the concentration however, can result in a depression of the melting point, which is desirable. Some additives raise the N-I transition faster than the S$_A$-N; some have the reverse effect, thus enabling the width of the nematic range, which is an important characteristic in some types of smectic displays, to be controlled.

The elevating effects of more than one additive of the second part of the base mixture on the transition temperature of the first part are cumulative as shown by examples (15) to (22) below. The use of more than one additive may be desirable since each exercises an incremental depression on the onset of melting. Moreover the more complex mixtures become increasingly difficult to freeze. Thus this invention provides smectic mixtures with a wide range of thermotropic properties.

The following description of specific examples of the invention illustrate its utility and how the temperature range of smectic A phases consisting of one or more members of compound classes (1) to (3) may be extended by addition of one or more members of compound classes (4) to (14).

EXAMPLE 1

(Use of a compound of class (5))

A smectic mixture was formed with the following composition by weight:
47.5% 4-cyano-4'-n-octylbiphenyl
37.05% 4-cyano-4'-n decylbiphenyl
10.45% 4-cyano-4'-n-decyloxybiphenyl
5.0% 4-cyano-4''-n-nonylterphenyl.

This mixture, hereinafter referred to as mixture A, has transition temperatures S$_A$-N, 54° C.; N-I, 56.2°–59.4° C.

Mixture A was mixed in different proportions by weight with 1-(4-cyano-4'-biphenylyl)-2-(4-n-octylphenyl)ethane (compound 5.1), and the table records measured transition temperatures for those mixtures:

| Mixture A | Compound 5.1 | S$_A$-N Transition temperature | N-I Transition temperature |
|---|---|---|---|
| 95% | 5% | 57.0° | 58.0–60.0° |
| 90% | 10% | 60.5° | 61.0–63.5° |
| 85% | 15% | | 64–68 (S-I: no nematic phase) |

EXAMPLE 2

(Use of a compound of class (6))

A smectic mixture was formed with the composition by weight:
58.8% 4-cyano-4'-n-octylbiphenyl
28.4% 4-cyano-4'-n decylbiphenyl
18.8% 4-cyano-4'-n-octyloxybiphenyl This mixture, hereinafter referred to as mixture B, has transition temperatures S$_A$-N, 46.6° C.; N-I, 50.8°–51° C.

Mixture B was mixed in different proportions by weight with 4-cyano-4'-(4-n-pentylcyclohexyl)-biphenyl (compound 6.1), and the table below records measured transition temperatures for those mixtures:

| Mixture B | Compound 6.1 | S$_A$-N Transition temperature | N-I Transition temperature |
|---|---|---|---|
| 98% | 2% | 48.1° | 53.5–53.7° |
| 96% | 4% | 49.5° | 55.8–56.3° |
| 94% | 6% | 50.8° | 58.0–58.8° |
| 92% | 8% | 51.9° | 59.9–60.9° |

EXAMPLE 3

(Use of a compound of class (7))

Mixture A was mixed in different proportions by weight with 4-cyano-4'-biphenylyl 4-n-heptylbiphenyl-4'-carboxylate (compound 7.1), and the table below records measured transition temperatures for those mixtures:

| Mixture A | Compound 7.1 | S$_A$-N Transition temperature | N-I Transition temperature |
|---|---|---|---|
| 99% | 1% | 55.7° | 57.5–59.2° |
| 98% | 2% | 56.9° | 58.8–61.6° |
| 97% | 3% | 58.4° | 60.2–64.0° |
| 96% | 4% | 59.7° | 61.7–66.7° |
| 95% | 5% | 61.0° | 62.8–69.1° |

EXAMPLE 4

(Use of a compound of class (9))

Mixture A was mixed in different proportions by weight with 4-cyano-4'-biphenylyl 4-n-decylbenzoate (compound 9.1), and the table below records measured transition temperatures for those mixtures:

| Mixture A | Compound 9.1 | $S_A$-N Transition temperature | N-I Transition temperature |
|---|---|---|---|
| 95% | 5% | 58.5° | 60.3–62.3° |
| 90% | 10% | 63.8° | 65.2–68.6° |
| 85% | 15% | 69.3° | 69.3–75.2° |

EXAMPLE 5

(Use of a compound of class (9))

Mixture A was mixed in different proportions by weight with 4-cyano-4'-biphenylyl 4-n-dodecylbenzoate (compound 9.2), and the table below records measured transition temperatures for those mixtures:

| Mixture A | Compound 9.2 | $S_A$-N Transition temperature | N-I Transition temperature |
|---|---|---|---|
| 97% | 3% | 56.7° | 57.9–60.0° |
| 94% | 6% | 59.4° | 60.5–63.4° |
| 91% | 9% | 62.5° | 63.4–66.9° |

EXAMPLE 6

(Use of a compound of class (10))

Mixture A was mixed in different proportions by weight with 4-cyano-4'-biphenylyl trans-4-n-ethylcyclohexane-1-carboxylate (compound 10.1), and the table below records measured transition temperatures for those mixtures:

| Mixture A | Compound 10.1 | $S_A$-N Transition temperature | N-I Transition temperature |
|---|---|---|---|
| 97% | 3% | 55.4° | 58.8–60.0° |
| 94% | 6% | 57.3° | 61.9–63.4° |
| 91% | 9% | 59.1° | 65.6–67.5° |
| 88% | 12% | 60.6° | 69.0–71.2° |
| 85% | 15% | 62.0° | 73.2–75.5° |

EXAMPLE 7

(Use of a compound of class (10))

Mixture A was mixed in different proportions by weight with 4-cyano-4'-biphenylyl trans-4-n-pentylcyclohexane-1-carboxylate (compound 10.2), and the table below records measured transition temperatures for those mixtures:

| Mixture A | Compound 10.2 | $S_A$-N Transition temperature | N-I Transition temperature |
|---|---|---|---|
| 97% | 3% | 56.7° | 59.0–61.1° |
| 94% | 6% | 58.5° | 61.5–63.5° |
| 91% | 9% | 60.8° | 64.8–67.1° |
| 88% | 12% | 63.6° | 68.6–71.8° |
| 85% | 15% | 65.8° | 72.0–75.3° |

EXAMPLE 8

(Use of a compound of class (10))

Mixture A was mixed in different proportions by weight with 4-cyano-4'-biphenylyl trans-4-n-heptylcyclohexane-1-carboxylate (compound 10.3), and the table below records measured transition temperatures for those mixtures:

| Mixture A | Compound 10.3 | $S_A$-N Transition temperature | N-I Transition temperature |
|---|---|---|---|
| 95% | 5% | 59.4° | 60.9–64.1° |
| 90% | 10% | 63.8° | 66.1–69.8° |
| 85% | 15% | 69.0° | 72.5–71.1° |
| 80% | 20% | 74.8° | 79.5–84.6° |

EXAMPLE 9

(Use of a compound of class (12))

Mixture A was mixed in different proportions by weight with 2-cyano-6-naphthyl trans-4-n-heptylcyclohexane-1-carboxylate (compound 12.1), and the table below records measured transition temperatures for those mixtures:

| Mixture A | Compound 12.1 | $S_A$-N Transition temperature | N-I Transition temperature |
|---|---|---|---|
| 94% | 6% | 56.7° | 59.8–61.5° |
| 90% | 10% | 58.6° | 62.8–64.1° |
| 85% | 15% | 60.7° | 67.0–68.2° |
| 80% | 20% | 63.3° | 71.0–72.5° |

EXAMPLE 10

(Use of a compound of class (13))

Mixture A was mixed in different proportions by weight with 4-cyano-4'-biphenylyl 4-n-octyloxybenzoate (compound 13.1), and the table below records measured transition temperatures for those mixtures:

| Mixture A | Compound 13.1 | $S_A$-N Transition temperature | N-I Transition temperature |
|---|---|---|---|
| 97% | 3% | 56.5–56.9° | 59.6–61.4° |
| 94% | 6% | 59.4–59.7° | 62.2–65.6° |
| 91% | 9% | 61.9–62.2° | 66.2–69.8° |

EXAMPLE 11

(Use of a compound of class (4))

Mixture A was mixed in different proportions by weight with 4-cyanophenyl 4-n-heptylbiphenyl carboxylate (compound 4.1), and the table below records measured transition temperatures for those mixtures:

| Mixture A | Compound 4.1 | $S_A$-N Transition temperature | N-I Transition temperature |
|---|---|---|---|
| 95% | 5% | 58.5° | 60.6–61.0° |
| 90% | 10% | 63.0° | 66.5–67.0° |
| 85% | 15% | 67.5° | 71.6–72.5° |

EXAMPLE 12

(Use of a compound of class (11))

Mixture A was mixed in different proportions by weight with 2-cyano-6-naphthyl 4-dodecylbenzoate (compound 11.1), and the table below records measured transition temperatures for those mixtures:

| Mixture A | Compound 11.1 | $S_A$-N Transition temperature | N-I Transition temperature |
|---|---|---|---|
| 90% | 10% | 58.0° | 60.8–61.9° |
| 85% | 15% | 61.0° | 63.9–65.4° |

EXAMPLE 13

(Use of a compound of class (8))

Mixture A was mixed in different proportions by weight with 4-cyano-4'-biphenylyl trans-4-n-heptylcyclohexylbenzoate (compound 8.1), and the table below records measured transition temperatures for those mixtures:

| Mixture A | Compound 8.1 | $S_A$-N Transition temperature | N-I Transition temperature |
|---|---|---|---|
| 99% | 1% | 55.0° | 56.8–59.4° |
| 98% | 2% | 57.3° | 58.9–62.7° |
| 97% | 3% | 58.1° | 59.9–64.3° |
| 96% | 4% | 59.3° | 62.0–66.4° |
| 95% | 5% | 60.8° | 63.6–71.5° |

EXAMPLE 14

(Use of a compound of class (14))

Mixture A was mixed in different proportions by weight with 2-cyano-6-naphthyl 4-n-octyloxybenzoate (compound 14.1), and the table below records measured transition temperatures for those mixtures:

| Mixture A | Compound 14.1 | $S_A$-N Transition temperature | N-I Transition temperature |
|---|---|---|---|
| 90% | 10% | 59.0° | 63.8–65.1° |
| 85% | 15% | 62.1° | 67.7–69.2° |

The following are examples of mixtures containing more than one compound selected from classes 4 to 14:

EXAMPLE 15

38.5% 4-Cyano-4'-n-octylbiphenyl
30.0% 4-Cyano-4'-n-decylbiphenyl
8.4% 4-Cyano-4'-n-decyloxybiphenyl
4.1% 4-Cyano-4''-n-nonylterphenyl
10.0% 4-Cyano-4'biphenyl trans-4-n-pentylcyclohexane-1-carboxylate
9.0% 4-Cyano-4'-biphenylyl trans-4'-n-heptylcyclohexane-1-carboxylate
$S_A$-N, 72.4° C.: N-I, 78.3°–83.2° C.

EXAMPLE 16

38.9% 4-Cyano-4'-n-octylbiphenyl
30.3% 4-Cyano-4'-n-decylbiphenyl
8.6% 4-Cyano-4'-n-decyloxybiphenyl
4.1% 4-Cyano-4''-n-nonylterphenyl
9.1% 4-Cyano-4'-biphenylyl trans-4-n-heptylcyclohexane-1-carboxylate
9.0% 4-Cyano-4'-biphenylyl 4-n-decylbenzoate
$S_A$-N, 70.0° C.: N-I, 72.8°–77.8° C.

EXAMPLE 17

40.2% 4-Cyano-4'-n-octylbiphenyl
31.3% 4-Cyano-4'-n-decylbiphenyl
8.8% 4-Cyano-4'-n-decyloxybiphenyl
4.3% 4-Cyano-4''-n-nonylterphenyl
9.4% 4-Cyano-4'-biphenylyl trans-4-n-heptylcyclohexane-1-carboxylate
6.0% 4-Cyano-4'-biphenylyl 4-n-heptylbiphenyl-4'-carboxylate
$S_A$-N, 67.3° C.: N-I, 70.7°–77.8° C.

EXAMPLE 18

36.0% 4-Cyano-4'-n-octylbiphenyl
28.0% 4-Cyano-4'-n-decylbiphenyl
8.8% 4-Cyano-4'-n-decyloxybiphenyl
3.8% 4-Cyano-4''-n-nonylterphenyl
8.4% 4-Cyano-4'-biphenylyl trans-4-n-heptylcyclohexane-1-carboxylate
10.0% 2-Cyano-6-naphthyl trans-4-n-heptylcyclohexane-1-carboxylate
6.0% 4-Cyano-4'-biphenylyl 4-n-decylbenzoate
$S_A$-N, 73.7° C.: N-I, 81.4°–84.4° C.

EXAMPLE 19

41.5% 4-Cyano-4'-n-octylbiphenyl
22.4% 4-Cyano-4'-n-decylbiphenyl
6.1% 4-Cyano-4'-n-decyloxybiphenyl
10.0% 4-Cyano-4'-biphenylyl trans-4-n-heptylcyclohexane-1-carboxylate
10.0% 4-Cyano-4'-biphenylyl trans-4-n-pentylcyclohexane-1-carboxylate
10.0% 2-Cyano-6-naphthyl trans-4-n-heptylcyclohexane-1-carboxylate
$S_A$-N, 71.7° C.: N-I, 83.1°–87.9° C.

EXAMPLE 20

42.1% 4-Cyano-4'-n-octylbiphenyl
22.8% 4-Cyano-4'-n-decylbiphenyl
6.2% 4-Cyano-4'-n-decyloxybiphenyl
4.5% 4-Cyano-4''-n-nonylterphenyl
8.4% 4-Cyano-4'-biphenylyl trans-4-n-heptylcyclohexane-1-carboxylate
10.0% 2-Cyano-6-naphthyl trans-4-n-heptylcyclohexane-1-carboxylate
6.0% 4-Cyanophenyl 4-n-heptylbiphenyl carboxylate
$S_A$-N, 72.2° C.: N-I, 81.7°–84.2° C.

EXAMPLE 21

36.8% 4-Cyano-4'-n-octylbiphenyl
28.6% 4-Cyano-4'-n-decylbiphenyl
8.1% 4-Cyano-4'-n-decyloxybiphenyl
3.9% 4-Cyano-4''-n-nonylterphenyl
8.6% 4-Cyano-4'-biphenylyl trans-4-n-heptylcyclohexane-1-carboxylate
10.0% 2-Cyano-6-naphthyl trans-4-n-heptylcyclohexane-1-carboxylate
4.0% 4-Cyano-4'-biphenylyl 4-n-heptylbiphenyl-4'-carboxylate
$S_A$-N, 73.9° C.: n-I, 81.7°–87.6° C.

EXAMPLE 22

This example illustrates the increasing depression of the onset of melting with increasing complexity of the mixture. In this example the following abbreviations are used:

K24 4-Cyano-4'-n-octylbiphenyl

K30 4-Cyano-4'-n-decylbiphenyl
M30 4-Cyano-4'-n-decyloxybiphenyl
T27 4-Cyano-4"-n-nonylterphenyl
C12E 4-Cyano-4'-biphenylyl 4-n-decylbenzoate
7-NAP 2-Cyano-6-naphthyl trans-4-n-heptylcyclohexane-1-carboxylate
7-CHE 4-Cyano-4'-biphenylyl trans-4-n-heptylcyclohexane-1-carboxylate
BB21 4-Cyano-4'-biphenylyl 4-n-heptylbiphenyl-4'-carboxylate

EXAMPLE 22

TABLE

| | Composition by % weight | | | | | | |
|---|---|---|---|---|---|---|---|
| K24 | 65.4 | 59.9 | 60.3 | 60.5 | 55.1 | 55.2 | 55.0 |
| K30 | 22.6 | 19.8 | 19.2 | 19.2 | 16.1 | 16.0 | 16.2 |
| M30 | 12.0 | 10.2 | 10.3 | 10.2 | 8.5 | 8.5 | 8.3 |
| T27 | | 10.1 | | | 10.3 | 10.4 | |
| C12E | | | | | 5.0 | 4.9 | 5.2 |
| 7-NAP | | | 10.2 | | 5.0 | | 5.1 |
| 7-CHE | | | | 10.1 | | 5.0 | 5.1 |
| BB21 | | | | | | | 5.1 |
| Onset of melting | −1.2° | −6.7° | −5.3° | −6.9° | −10.3° | −14.4° | −17.2° |
| $S_A$-N Transition Temperature | 45.5° | 57.9° | 49.8° | 58.3° | 66.0° | 69.3° | 64.7° |
| N-I Transition temperature | 48.2–48.3° | 62.1–64.7° | 56.1–56.9° | 61.1–64.4° | 72.0–74.7° | 73.3–79.0° | 74.5–80.0° |

We claim:

1. A method for the extension of the temperature range for the smectic A phase of a base liquid crystal composition consisting essentially of materials selected from the following six compound classes,

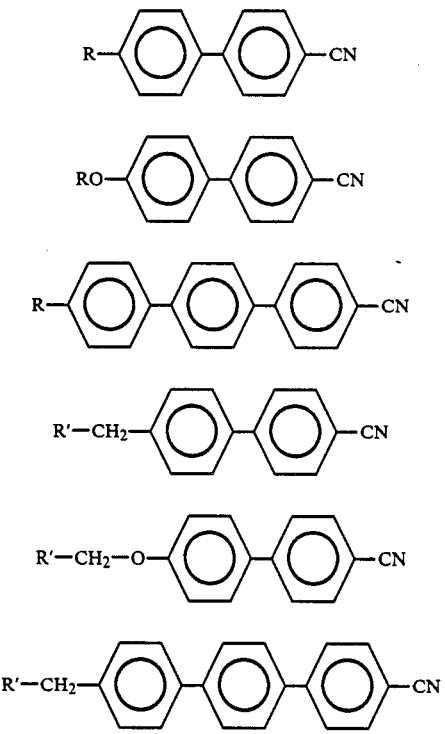

wherein R is in every instance an alkyl chain containing between 2 and 18 carbon atoms, and R' is in every instance an alkyl chain containing between 1 and 17 carbon atoms wherein one or more non-adjacent CH₂-groups are replaced by oxygen atoms, and wherein there are present at least two compounds from class (1) and at least one compound from class (2) in each case R being an n-alkyl chain containing at least 8 carbon atoms, and the resultant composition having an $S_A$-N transition temperature, comprising including in said composition, as a second part, between 1 and 60% by weight of one or more liquid crystalline compounds of high birefringence and high positive dielectric anisotropy, said amount being effective to raise said $S_A$-N transition temperature:

wherein the second part compounds are selected from classes (5), (6) and (10)

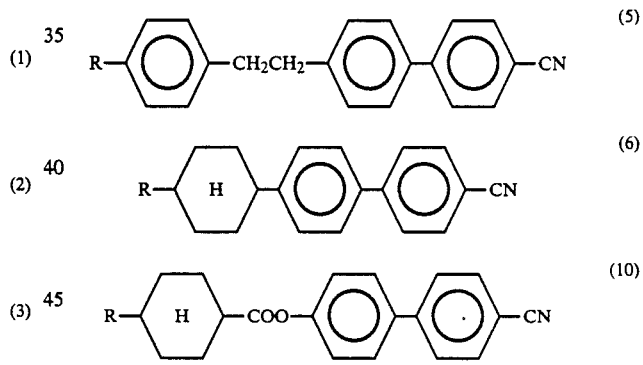

wherein R is in every instance an alkyl chain containing between 2 and 18 carbon atoms.

2. A method of claim 1, wherein the base liquid crystal composition comprises at least the following three compounds:
4-cyano-4'-n-octylbiphenyl
4-cyano-4'-n-decylbiphenyl
4-cyano-4'-decyloxybiphenyl.

3. A method of claim 2, wherein the base liquid crystal composition further comprises a compound from class (3).

4. A method of claim 3, wherein the base compound from class (3) is
4-cyano-4"-n-nonylterphenyl.

5. A method of claim 1, wherein the base liquid crystal composition consists essentially of compounds from classes (1), (2) and optionally (3), wherein R in each case is a n-alkyl chain containing 8 to 10 carbon atoms.

6. A method of claim 5, wherein the base liquid crystal composition consists essentially of the compounds 4-cyano-4'-n-octylbiphenyl, 4-cyano-4'-n-decylbiphenyl, 4-cyano-4'-n-decyloxybiphenyl and 4-cyano-4"-n-nonylterphenyl.

7. In a liquid crystal cell containing a liquid crystal phase, the improvement wherein the phase is the smectic A phase of a base liquid crystal composition consisting essentially of materials selected from the following six compound classes,

 (1)

 (2)

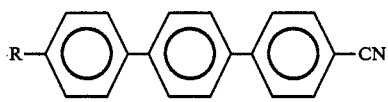 (3)

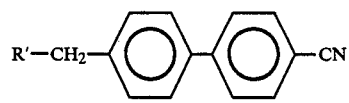 (1')

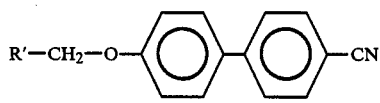 (2')

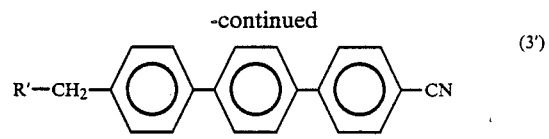 (3')

wherein R is in every instance an alkyl chain containing between 2 and 18 carbon atoms, and R' is in every instance an alkyl chain containing between 1 and 17 carbon atoms wherein ne or more non-adjacent $CH_2$-groups are replaced by oxygen atoms, and wherein there are present at least two compounds from class (1) and at least one compound from class (2) in each case R being an n-alkyl chain containing at least 8 carbon atoms, and the resultant composition having an $S_A$-N transition temperature, and as a secondary part, between 1 and 60% by weight of one or more liquid crystalline compounds of high birefringence and high positive dielectric anisotropy, said amount being effective to raise said $S_A$-N transition temperature, wherein the second part compounds are selected from classes (5), (6) and (10)

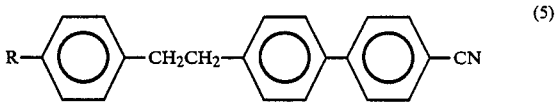 (5)

 (6)

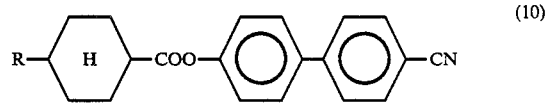 (10)

wherein R is in every instance an alkyl chain containing between 2 and 18 carbon atoms.

* * * * *